Patented Feb. 23, 1937

2,071,354

UNITED STATES PATENT OFFICE 2,071,354

FIREPROOFING COMPOSITIONS

Willard L. Morgan, Nutley, N. J., assignor to Sylvania Industrial Corporation, Fredericksburg, Va., a corporation of Virginia No Drawing. Application July 13, 1935, Serial No. 31,230

6 Claims. (Cl. 134—78.6)

The invention relates in general to fireproofing and flame proofing compositions, and in particular to the fireproofing of organic hydrophilic colloids, as well as to correlated improvements directed towards enhancing the physical characteristics and extending the usefulness of articles formed from such colloids.

Articles formed from organic hydrophilic colloidal materials, i. e., organic colloids swelling in water, such, for example, as sheets and films of regenerated cellulose, are extensively used in the wrapping, packaging, textile and cordage arts, and also in window and stage decoration. These materials are characterized by a flammability at least equal to fibrous paper, which greatly restricts their use in certain installations especially theatrical stage sets, and window decorations. To render such materials fireproof, the fireproofing agent must have the following requisites:—soluble in colloidal material to such an extent as not to detract from the transparency of the material, and a relativly low vapor pressure. If possible, the fireproofing agent should be further characterized by being non-poisonous, non-odorous and light-stable.

It is a general object of the invention to provide fireproofing compositions which are soluble in a wide range of solvents, and which are liquids having relatively low vapor pressures.

It is another object of the invention to provide a fireproofing composition which is relatively soluble in water and adapted for incorporation in articles formed from organic hydrophilic colloidal materials to render them fireproof but without detracting from the flexibility, transparency and strength of the article.

Another object of the invention is to provide a composition for fireproofing articles formed from various materials so that the articles are not only non-flaming, but also non-flame-propagating. In addition, the invention provides compositions of matter that are effective and economical fireproofing and flame proofing agents.

Other objects of the invention will in part be obvious and will in part appear hereinafter.

The invention accordingly comprises a novel fireproofing agent for articles formed from organic hydrophilic colloidal materials, possessing the features, properties and the relation of elements which will be exemplified in the composition hereinafter described and the scope of the invention will be indicated in the claims.

In accordance with the invention, articles formed from various materials, more particularly organic hydrophilic colloidal materials may be fireproofed by combining them with a water soluble salt of a sulphonated, carboxylated or hydroxylated aryl, alkaryl, preferably containing a methyl or an ethyl group, or aralkyl derivatives of an acid of phosphorus, such as ortho-phosphoric acid ($H_3PO_4$, tribasic), pyrophosphoric acid $H_4P_2O_7$, tetrabasic), metaphosphoric acid ($HPO_3$, monobasic), hypophosphoric acid ($H_2PO_3$, monobasic), phosphorous acid ($H_3PO_3$, dibasic), hypophosphorous acid ($H_3PO_1$, monobasic).

Where the phosphorous acid contains more than one replaceable hydrogen, one or more of such hydrogens may be replaced by an aralkyl group, such for example as a benzyl radical, by an aryl group, as a phenyl or naphthl group, or by an alkaryl group, a methyl phenyl, ethyl phenyl, etc. One or more sulphonic, carboxylic, or hydroxyl groups may be substituted for the hydrogens of the aromatic rings present in the aralkyl, alkaryl or aryl groups. The water soluble salts may be formed by replacing, with the ammonium radical or a metal of the alkali or alkaline earth groups, one or more of the hydrogens of the hydroxyl groups attached to the phosphorous atom and/or one or more of the hydrogens of the sulphonic, carboxyl, or hydroxyl groups which are attached to the aromatic rings of the aralkyl, alkaryl or aryl groups. The water soluble salts containing a sulphonic grouping may be considered as having the following probable general formula

in which P represents an oxygen-containing phosphorous acid residue, R is an aralkyl, alkaryl or aryl group, X is the ammonium radical or a metal selected from the alkali or alkaline earth groups, $m$ has the maximum value of 3 and $n$ has a maximum value of 4. A general formula for the salts containing the carboxyl and hydroxyl groupings will be as that given above with appropriate substitutions for the sulphonic groupings. It will be understood that wherever this formula is given it encompasses the carboxyl and hydroxyl compounds. When a hydrogen of a phosphorous acid hydroxyl is replaced the probable general formula would be represented as follows:

in which P represents an oxygen-containing phosphorous acid residue, R is an aralkyl, alkaryl or aryl group, X is the ammonium radical or a metal selected from the alkali or alkaline earth groups, $m$ has a maximum value of 3 and $n$ has a maximum value of 3.

It has been found that the above mentioned water soluble salts of the sulphonated, carboxylated or hydroxylated aralkyl, alkaryl and aryl phosphorous acids are capable, when used in sufficient concentration, of rendering organic hydrophilic colloidal materials fireproof. The fireproofing agents of the invention may be used in conjunction with softening agents to maintain the flexibility of the colloid. By way of illustrating the invention, a sheet of regenerated cellulose is soaked in a solution containing 20% of triphenyl phosphate di-sodium sulphonate,

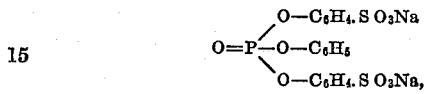

and 15% of glycerine, and the sheet dried. The dried treated sheet is transparent, flexible, strong, and fireproofed to a degree such that the material flames only as long as an external flame is directly applied. When the external flame is removed, however, the flaming of the material ceases after a short period of time depending upon the concentration of the salt in the material. Compared with ordinary untreated fibrous paper, the treated material is also relatively non-flame-propagating.

It has now been found that the fireproofness of such articles may be further improved, so that the article does not flame and does not propagate flame, by using a water soluble salt above described in admixture with a salt of ammonia with an inorganic acid selected from the group consisting of hydrobromic, hydriodic, selenic, sulphuric and phosphoric. For example, a sheet of regenerated cellulose may be soaked in an aqueous solution comprising 5% by weight of ammonium bromide and 15% by weight of a di-sodium mono-naphthyl phosphate di-sodium sulphonate

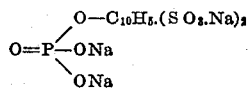

The treated sheet may be softened if desired and then dried. When a flame is brought into contact with the treated sheet, the material is destroyed by flameless combustion, but as soon as the flame is removed the combustion stops. The sheet material itself does not propagate the flame, nor does the ash glow for any appreciable time.

It is to be understood that the fireproofing agents herein described may be used singly or in compatible admixtures with one another, or combined in any suitable proportion with one or more of the ammonium salts above described. An ammonium salt may be present in the solution in an amount of from 3 to 10%. In general, it has been found sufficient to incorporate in the material from 10% to 20% by weight of fireproofing agents herein described, although the upper limit is determined by the solubility of the fireproofing substance in the particular colloidal material treated, and the tackiness of finished material, and the lower limit by the fireproofness desired.

The fireproofing agents of the present invention are adapted for treating a variety of materials, more particularly film-forming organic hydrophilic colloids, for example, gelatin, casein, and cellulose derivatives, such as cellulose ethers, cellulose oxy-ethers, and cellulose hydrate. The cellulose hydrate may be regenerated from viscose, cuprammonium cellulose, or from aqueous solutions of cellulose in inorganic salts, such as zinc chloride; also from the de-esterification of cellulose esters, as the acetates and nitrates. Further, the organic colloids may be treated while in the form of films, filaments, sheets, bands, hollow bodies and other articles fabricated in whole or in part from such colloids.

The fireproofing agents of the invention may be added to the original solutions of the colloids from which articles are to be formed, or the article may be impregnated by contacting with an aqueous solution of a fireproofing agent.

The fireproofing agents of the present invention impart a high degree of fireproofness to organic hydrophilic colloids without detracting from the transparency, flexibility and strength thereof or of articles formed therefrom. The fireproofing agents are further characterized by being water soluble, odorless, tasteless and non-poisonous.

Since the water soluble salts of the aralkyl, alkaryl and aryl phosphorous acids are non-hygroscopic and have no softening action upon the colloids, they may be used in proportions greater than those possible with fireproofing agents which are hygroscopic and/or tend to soften such materials. This characteristic also enables a softening agent to be used in conjunction with the fireproofing agent to obtain the desired degree of flexibility in the product.

In the appended claims, the expression "fireproof" is intended to designate that degree of non-inflammability at which the fireproofed material will not show a self-sustaining combustion when ignited and the external flame removed, and when the ambient atmosphere is at room temperature. Further, the expression "aryl group" is intended to include the aryl, alkaryl and aralkyl groups whether containing one or several ring structures of the aromatic series, and "sulphonated" encompasses carboxylated and hydroxylated.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A fireproofing composition comprising a water soluble salt of a sulphonated aryl derivative of an acid of phosphorus.

2. A fireproofing composition comprising a water soluble salt of a sulphonated phenyl derivative of an acid of phosphorus.

3. A fireproofing composition comprising a water soluble salt of a sulphonated benzyl derivative of an acid of phosphorus.

4. A fireproofing composition comprising a water soluble salt having the following probable general formula

in which P represents an oxygen-containing phosphorous acid residue, R is an aralkyl, alkaryl or aryl group, X is the ammonium radical or a metal selected from the alkali or alkaline earth groups, "$m$" has a maximum value of 3 and "$n$" has a maximum value of 4.

5. A fireproofing composition comprising a water soluble salt having the following probable general formula

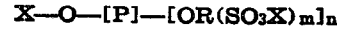

in which P represents an oxygen-containing phosphorous acid residue, R is an aralkyl, alkaryl or aryl group, X is the ammonium radical or a metal selected from the alkali or alkaline earth groups, "$m$" has a maximum value of 3 and "$n$" has a maximum value of 3.

6. A fire and flame-proofing composition comprising a water soluble salt of a sulphonated aryl derivative of an acid of phosphorus, and a salt of ammonia with an inorganic acid selected from the group consisting of hydrobromic, hydriodic, selenic, sulphuric and phosphoric acid.

WILLARD L. MORGAN.